(12) United States Patent
Rodgers et al.

(10) Patent No.: US 8,733,252 B2
(45) Date of Patent: May 27, 2014

(54) ELECTRIC MONORAIL PART CARRIER

(75) Inventors: Hans E. Rodgers, Grand Blanc, MI (US); Ronald J. Benish, Farmington Hills, MI (US); Robert J. Walkerdine, Highland, MI (US); John P. Pasto, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 211 days.

(21) Appl. No.: 13/407,958

(22) Filed: Feb. 29, 2012
(Under 37 CFR 1.47)

(65) Prior Publication Data
US 2012/0247362 A1    Oct. 4, 2012

Related U.S. Application Data

(60) Provisional application No. 61/449,295, filed on Mar. 4, 2011.

(51) Int. Cl.
*B61B 13/04*    (2006.01)
(52) U.S. Cl.
USPC .................... 104/118; 191/22 C; 191/22 R

(58) Field of Classification Search
USPC ........ 104/118–120; 191/33 R, 40, 41, 45, 50, 191/52, 53, 57, 85, 22 R
See application file for complete search history.

(56) References Cited

U.S. PATENT DOCUMENTS

| 5,277,285 | A  | * | 1/1994  | Musachio      | 191/6   |
| 5,676,061 | A  | * | 10/1997 | Loomer        | 105/141 |
| 6,619,342 | B2 | * | 9/2003  | Graham et al. | 141/231 |
| 7,559,282 | B2 | * | 7/2009  | Austin        | 105/141 |
| 2011/0266108 | A1 | * | 11/2011 | Kitaguchi  | 191/22 C |
| 2012/0247362 | A1 | * | 10/2012 | Rodgers et al. | 104/118 |

* cited by examiner

*Primary Examiner* — Jason C Smith
(74) *Attorney, Agent, or Firm* — Quinn Law Group, PLLC

(57) ABSTRACT

An electrified monorail assembly includes a track having a length, a plurality of electrically conductive buss bars disposed along the length of the track, and a controller disposed on the track. The controller is in electrical communication with the plurality electrically conductive of buss bars, and configured to selectively energize the plurality of electrically conductive buss bars. The assembly further includes a proximity sensor disposed on the track and in communication with the controller, the proximity sensor configured to detect the presence of a trolley assembly on the track.

17 Claims, 4 Drawing Sheets

ELECTRIC MONORAIL PART CARRIER

CROSS REFERENCE TO RELATED APPLICATIONS

This application claims the benefit of U.S. Provisional Application No. 61/449,295, filed Mar. 4, 2011, which is hereby incorporated by reference in its entirety.

TECHNICAL FIELD

The present disclosure relates to monorail systems used in various applications, typically manufacturing and assembly operations, and more particularly to a monorail buss control system and method that can be implemented with less cost and complexity than previously developed monorail conveyor systems without sacrificing utility and efficiency of the system.

BACKGROUND

Electrified monorail conveyor systems are often employed in assembly and manufacturing environments to move component parts from one location within an assembly environment (often a factory) to another station. Such systems generally are quieter and cleaner to operate than conveyor systems that use chains to pull part carriers along a predetermined path. However, electrified monorail conveyor systems have traditionally been fairly costly to implement, which has in some applications limited their applicability. Typical electrified monorail conveyor systems often include a plurality of tractor assemblies, sometimes referred to as "carrier" assemblies that are independently propelled along an electrified track. For simplicity these will be referred to simply as "trolley assemblies". The trolley assemblies typically carry a part or subassembly thereon from one station of an assembly or processing facility to another station. Typically each trolley assembly has its own electronic controller that is mounted thereon, and uses control signals transmitted along one or more conductors extending along the track to control motion of its associated carrier assembly. Obviously, the need to include an electronic controller for each and every carrier assembly adds significant cost to the overall system.

SUMMARY

An electrified monorail assembly includes a track having a length, a plurality of electrically conductive buss bars disposed along the length of the track, and a controller disposed on the track. The controller is in electrical communication with the plurality of electrically conductive buss bars, and is configured to selectively energize the plurality of buss bars. The assembly further includes one or more proximity sensor disposed on the track and in communication with the controller, the proximity sensor may be configured to detect the presence of a trolley assembly on the track.

The assembly may further include a trolley assembly configured to ride along the length of the track. The trolley assembly may include a brush plate configured to be placed in electrical communication with the plurality of buss bars, and a drive motor in communication with the brush plate. The drive motor is configured to propel the trolley assembly along the track when the buss bars are energized, such as by driving a friction wheel in contact with a surface of the track. A load bar may be coupled with the trolley assembly, wherein a carrier fixture is suspended from the load bar. The carrier fixture may be specially adapted to support one or more component parts.

The controller may be configured to provide a control signal to an adjacent monorail assembly if the presence of a trolley is detected by the first proximity sensor. The control signal may include an indication to de-energize the adjacent track.

A second proximity sensor may be disposed on the track and in communication with the controller, wherein the second proximity sensor is configured to detect the presence of a trolley assembly on the track. The controller may be configured to de-energize the plurality of buss bars if the presence of a trolley is detected by the second proximity sensor. In one configuration, the controller may be configured to electrically couple with a control signal buss and with an AC power buss.

Similarly, an electrified monorail system may include a first electrified monorail assembly and a second electrified monorail assembly. Each of the first and second electrified monorail assemblies may respectively include a track having a length, a plurality of electrically conductive buss bars disposed along the length of the track, and a controller disposed on the track and in electrical communication with the plurality of buss bars, wherein the controller is configured to selectively energize the plurality of electrically conductive buss bars. Each assembly may likewise include a proximity sensor disposed on the track and in communication with the controller, the proximity sensor may be configured to detect the presence of a trolley assembly on the track.

In one configuration, the controller of the second electrified monorail assembly may be configured to send a control signal to the controller of the first electrified monorail assembly when the proximity sensor of the second electrified monorail assembly detects the presence of a trolley assembly. In response to the control signal, the controller of the first electrified monorail assembly is configured to de-energize the plurality of buss bars of the first electrified monorail assembly.

Likewise, the controller of the first electrified monorail assembly may be configured to de-energize the plurality of buss bars of the first electrified monorail assembly if the presence of a first trolley assembly is detected by the proximity sensor of the first electrified monorail assembly and the track of the second electrified monorail assembly is occupied by a second trolley assembly.

The above features and advantages and other features and advantages of the present invention are readily apparent from the following detailed description of the best modes for carrying out the invention when taken in connection with the accompanying drawings.

DETAILED DESCRIPTION

Figure 1:
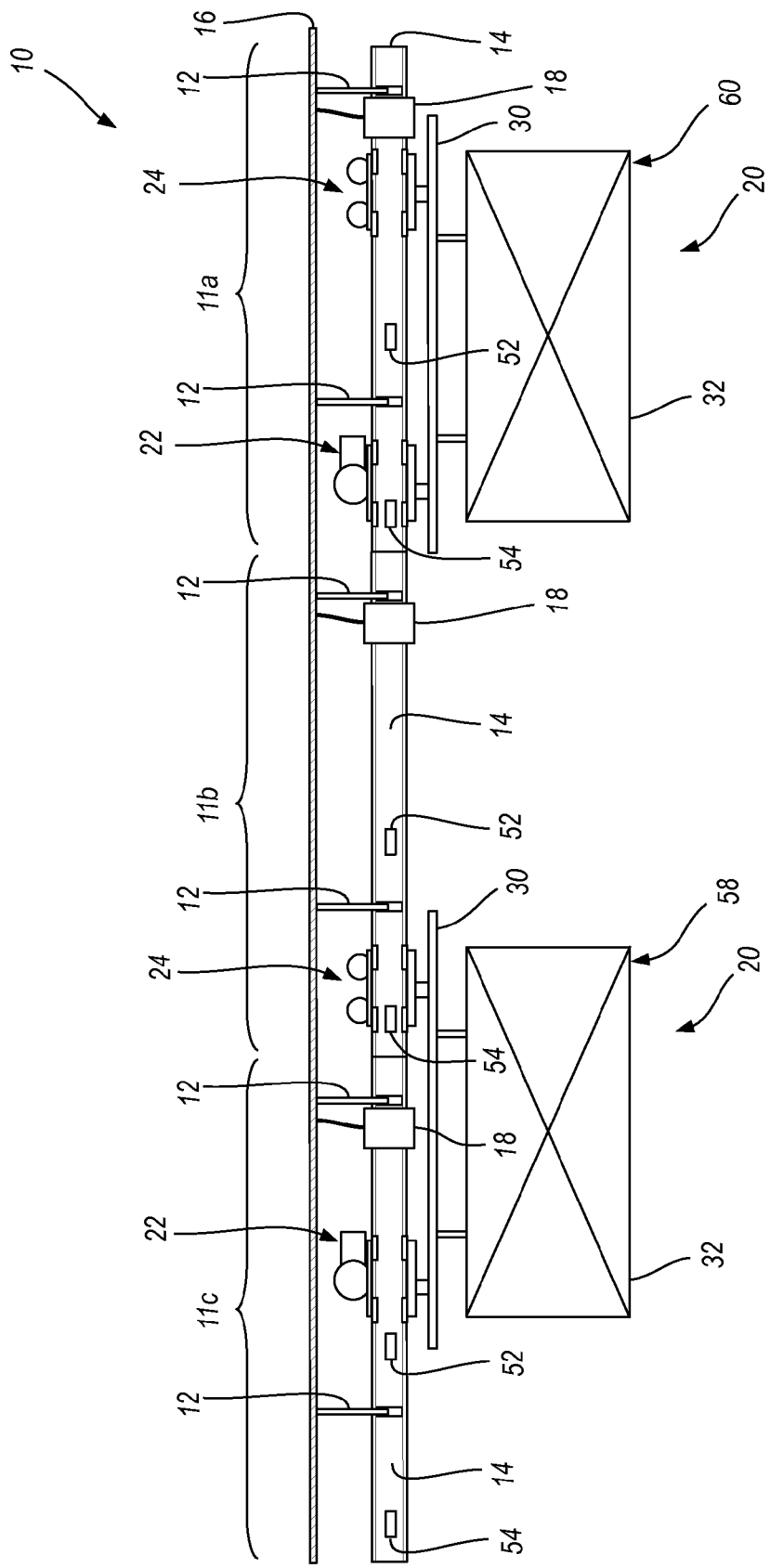
FIG. 1 is a schematic side view of one embodiment of a modular, electrified monorail buss control rail system in accordance with the present disclosure that makes use of a plurality of modular, electrified monorail rail assemblies coupled adjacent to one another.

Referring to FIG. 1, there is shown a modular, electrified, monorail system 10 that makes use of a plurality of identical electrified monorail rail assemblies 11a, 11b and 11c. For convenience each of the electrified monorail rail assemblies 11a-11c may be singularly referred to in a general manner as a "rail assembly" 11. It should also be appreciated that while only three complete rail assemblies 11a-11c are shown in FIG. 1, in a typical application, many more may be coupled together to form a full path of travel through an assembly plant or processing plant. The path of travel may include long straight lengths as well as turns and elevation changes. Conventional track switches may also be employed in connection with the rail assemblies 11a-11c to route different components to different assembly or processing stations within an assembly or processing plant.

Each rail assembly 11 may include a plurality of conventional yokes or hangers 12 that suspend a selectively electrified track 14 from an overhead support beam 16. In one configuration, the electrified track 14 may resemble an I-beam. As will be described in greater detail below, each rail assembly 11 may include a controller 18 that may be configured to control the selective delivery of electricity to the electrified track 14. The support beam 16 may employ a cable tray, or other cable organizing means, to hold various electrical cables along the beam 16. The cable tray may support T-couplings (not shown) where electrical connections can be made between the rail assembly 11 components and the electrical cables running along the support beam 16.

With continued reference to FIG. 1, one or more motorized part carriers 20 may be configured to ride along the plurality of rail assemblies 11a-11c. Each part carrier 20 may include a motorized trolley assembly 22 and one or more idler assemblies 24 to movably suspend a load bar 30 and/or carrier fixture 32 from the electrified track 14. Depending on the overall length of the part carrier 20 and the load which it is expected to carry, additional idler assemblies 24 may likewise be employed to distribute the load. The carrier fixture 32 may be specifically adapted to hold one or more of a particular type of component part that may be used in an assembly operation (e.g. an automotive part such as a vehicle door frame). Additionally, the load bar 30 may include conventional rubber bumpers 34 at opposing longitudinal ends thereof to cushion and protect the load bar 30 (as more clearly shown in FIGS. 2A and 2B).

Figure 2A:
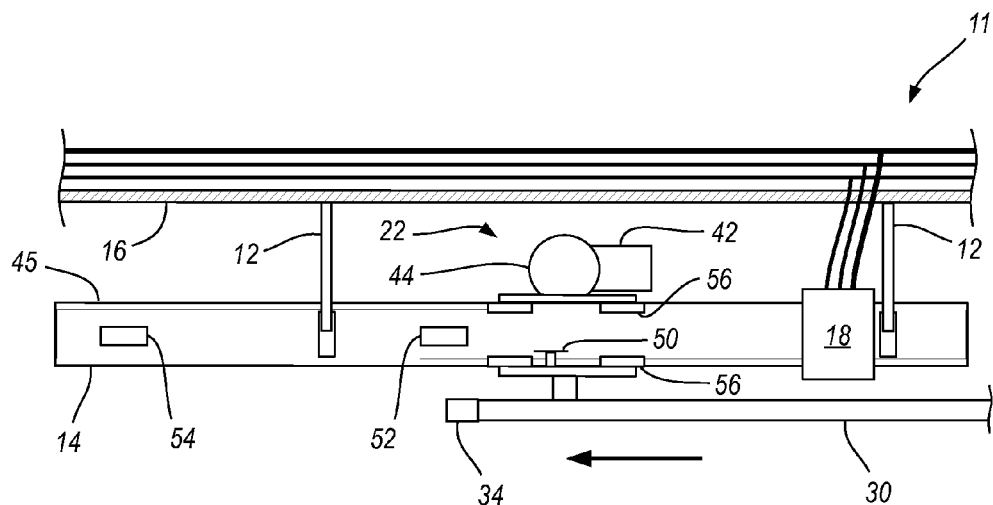
FIG. 2A is an enlarged schematic front side view of one of the modular rail assemblies shown in FIG. 1.
Figure 2B:
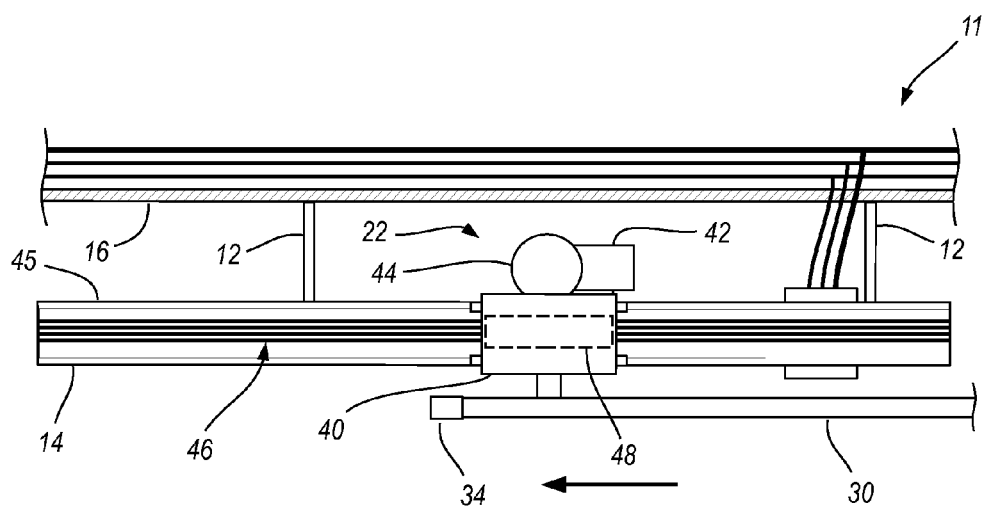
FIG. 2B is an enlarged schematic rear side view of the modular rail assemblies shown in FIG. 2A.

FIGS. 2A and 2B illustrate a single rail assembly 11 and trolley assembly 22 in greater detail. It should be appreciated that other rail assemblies in the system 10 may generally be constructed in a similar manner. The motorized trolley assembly 22 may be viewed as a "drive" trolley because it provides the motive force to propel the part carrier 20 along the electrified track 14 of the rail assembly 11. The trolley assembly 22 may include a frame portion 40 that supports a drive motor 42 thereon. The drive motor 42 may be a gear motor that is configured to power a friction wheel 44 that rides on an upper surface 45 of the electrified track 14. The drive motor 42 may be powered by a suitable power signal supplied along a plurality of electrified buss bars 46 extending along the track 14 of each rail assembly 11. An exemplary power signal may be a 3-phase 480 VAC power signal, although signals of other magnitudes may also be used. The frame portion 40 may also include a brush plate 48 that is configured to engage/contact the plurality of electrified buss bars 46 and supply the drive motor 42 with electrical power supply (i.e., when the buss bars 46 are energized). The trolley assembly 22 may also include a sensor flag 50 that may be used to interface with one or more proximity sensors 52 and 54 disposed along the length of the track 14. Finally, one or more stabilizing wheels 56 may be rotationally supported from the frame portion 40 to enable smooth rolling motion of the trolley assembly 22 along the track 14.

With brief reference to FIG. 1, the idler assembly 24 may include a plurality of unpowered wheels to enable free rolling motion of the idler assembly 24 along the track 14. The load bar 30 may be fixedly secured to both the trolley assembly 22 and the idler assembly 24, such that the entire part carrier 20 may be propelled along the track 14 by the drive motor 42.

The controller 18 may be mounted on the electrified track 14 in a manner that does not interfere with movement of the trolley assembly 22 and/or idler assembly 24 along the track 14. The controller 18, in one embodiment, may be an integrated distributed controller or motor-starter controller that assists in controlling motion of the part carrier 20 along the electrified track 14 by selectively switching power to the buss bars 46. The system 10 is not limited to use only with integrated distributed controllers but rather may incorporate any other suitable form of controller 18 capable of controlling the application of electrical power to the track 14.

As mentioned above, the rail assembly 11 may include one or more proximity sensors 52 and 54 disposed along the track 14. The first sensor 52 may be viewed as an "arrival" or "clear" sensor and may sense the arrival of one of the trolley assemblies 22 onto a particular rail assembly 11. The arrival/clear sensor 52 may also indicate to the prior rail assembly (via the controller 18) that the upstream rail assembly is clear and may either de-energize or receive a subsequent trolley assembly 22. For example, referring to FIG. 1, if the clear sensor 52 on rail assembly 11a is tripped, it would indicate that part carrier 58 is now on rail assembly 11a and rail assembly 11b is now available to accept part carrier 60.

A second sensor 54 may be viewed as a "stop" sensor and may be configured to stop the forward motion of a trolley assembly 22 if the downstream rail assembly is not clear. For example, with reference to FIG. 1, the stop sensor 54 on rail assembly 11c may halt the motion of carrier 60 until rail assembly 11b is indicated as clear (via the clear sensor 52 on rail assembly 11a). In one configuration, the stop sensor 54 may halt motion of the carrier 60 by eliminating the supply of electrical power to the trolley assembly 22 via the controller 18. If, however, the downstream rail assembly is clear, the stop sensor 54 may ensure that it is energized to allow the carrier 60 to continuously move between the rails. While sensors 52 are described in terms of a proximity sensor, other suitable sensors may similarly be used.

An important advantage of the system 10 is that the rail assemblies 11 are modular in construction. By "modular" it is meant that each rail assembly 11 is freely replaceable with minimal reconfiguration (i.e., plug and play). As such, each rail assembly 11 includes its own controller 18 and sensors 52 and 54, in addition to all T-connectors that enable it to be quickly and efficiently coupled to the electrical cabling extending along the support beam 16. By providing each track 14 with its own controller 18, rather than including a separate controller on each trolley assembly 22, a significant cost savings is realized without compromising the overall utility of the system 10. The rail assemblies 11 may be provided in any suitable length that will be dictated at least in part by the needs of the specific application. However, it is anticipated that the rail assemblies 11, in many applications, will have an overall length between about four to six meters.

Figure 3:
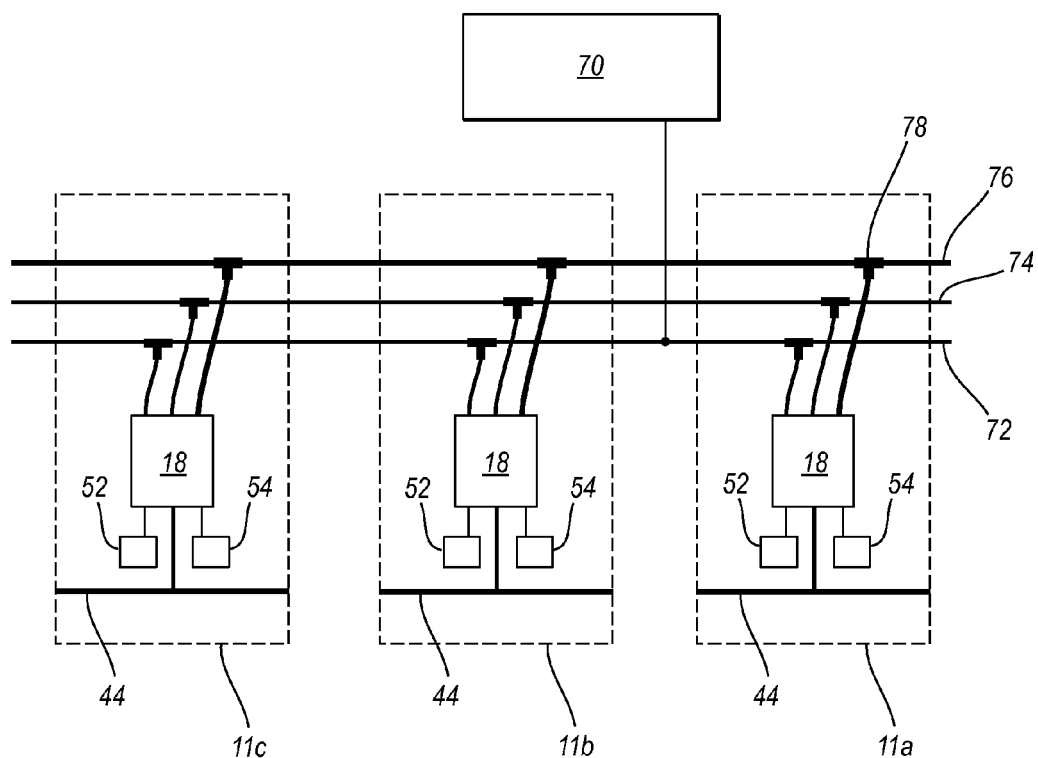
FIG. 3 is a simplified electrical schematic diagram showing how a logic controller is electrically in communication with each of the controllers of the rail assemblies.

A high level electrical schematic diagram is shown in FIG. 3 that illustrates the rail assemblies 11a-11c being coupled to various electrical lines extending along the support beam 16. A supervisory controller (e.g., a programmable logic controller 70 or simply "logic controller" 70), may communicate with each controller 18 over a control signal buss 72 to assist the respective controllers 18 in selectively turning on and off power to their respective high power buss bars 46. An auxiliary control power signal (e.g., a 120 VAC signal) may be supplied on a power buss 74 to power the controllers 18 mounted on each track 14.

Finally, a high voltage, three phase power signal may be supplied to each rail assembly 11 via a common power buss 76. Because of the common power supply, separate phase synchronization between the rail assemblies is not needed. Each controller 18, at the direction of addressed control signals provided via the control buss 72, may selectively gate the supply power from the power buss 76 onto the high power buss bars 46 of its respective track 14 to drive a carrier motor. The first and second sensors 52 and 54 of each track 14 may also be electrically coupled to the controller 18 of their associated track 14, with I/O shared from the controller 18 over the control buss 72. T-couplings 78 and other plug in cables may be used to make the required connections between the electrical cables 72, 74, 76 and the controller 18 of each track 14.

Figure 4:
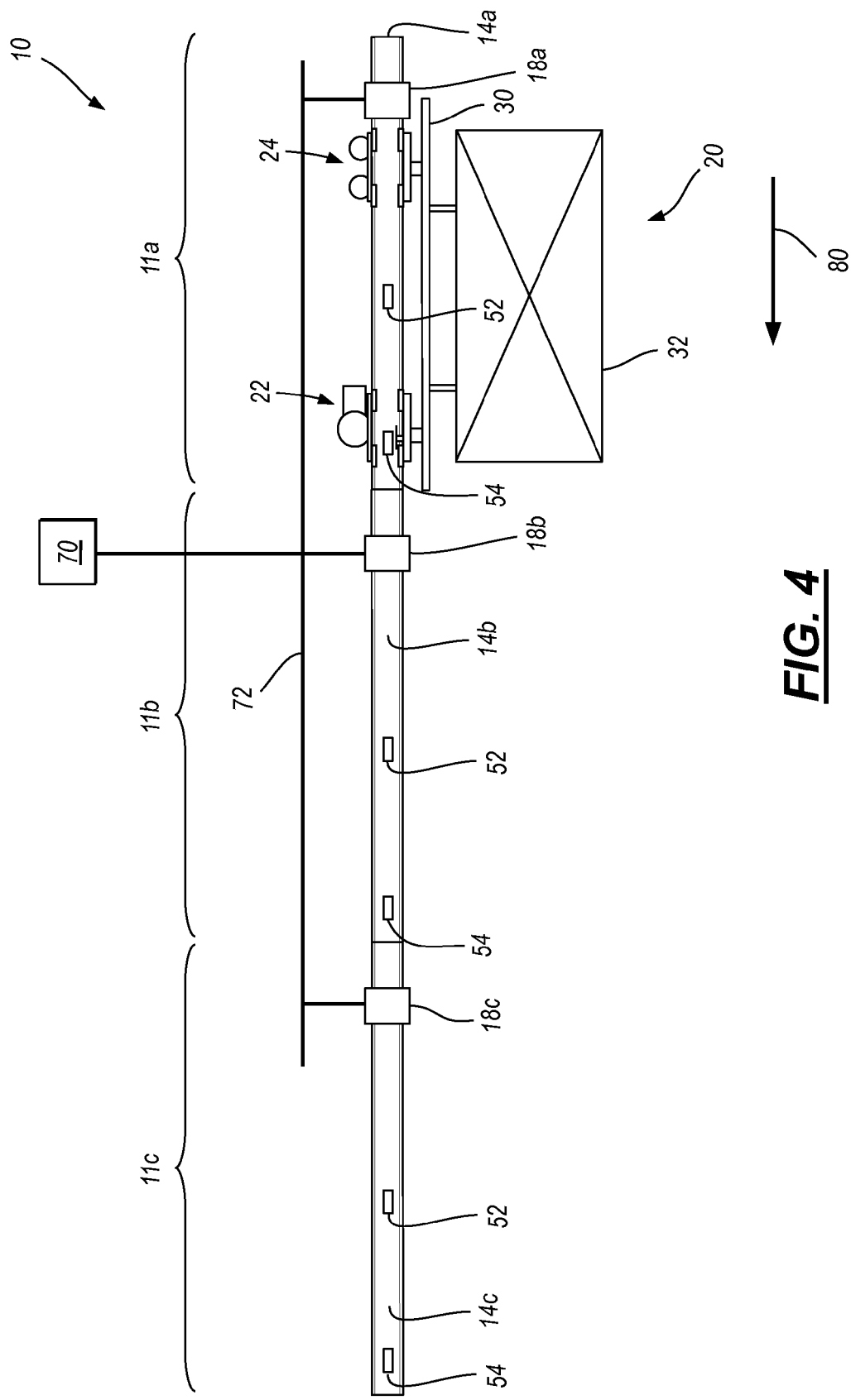
FIG. 4 is a schematic diagram illustrating how movement of a trolley assembly occurs along a plurality of the rail assemblies.

With reference to FIG. 4, a sequence of operation of the system 10 will now be provided. For the purpose of discussion, the components including the trolley assembly 22, the idler assembly 24, the load bar 30 and the carrier 32 will be referred to collectively as the "part carrier" 20. In operation, the part carrier 20 may initially be present on track 14a of rail assembly 11a. The controller 18c on rail assembly 11c may supply a signal to the logic controller 70 indicating that track 14b is clear to accept the part carrier 20. The controller 18c on track 14c knows this because a carrier assembly moving from track 14b to 14c actuated the track 14c clear sensor 52 (i.e., sensing the presence of a carrier assembly). The logic controller 70 then applies a control signal to the controller 18a of track 14a and the controller 18b of track 14b instructing both controllers 18a, 18b to apply power to their high power buss bars 46. This simultaneously causes the controllers 18a and 18b to turn on power to their respective high power buss bars 46. When this occurs, power is applied through the high power buss bars 46 to the drive motor 42 causing drive motor 42 to begin propelling the part carrier 20 in the direction of arrow 80. The flag 50 mounted on the trolley assembly 22 will pass stop sensor 54 on track 14a which informs the controller 18a that the part carrier 20 is moving off of the track 14a. The part carrier 20 will continue to travel to track 14b. When the part carrier 20 passes the clear sensor 52 on track 14b, then this information is sent to logic controller 70 which tells the controller 18a to turn off power to the high power buss bars 46 on track 14a if there is no carrier assembly present on the prior (i.e., upstream) track. However, power at this time remains turned on to the high power buss bars 46 of track 14b by controller 18b, which continues to power the drive motor 42 along the track 14b. When the flag 50 trips the stop sensor 54 on track 14b, the controller 18b turns off the high power signal to its high power buss bars 46, and the part carrier 20 will quickly coast to a stop within a predetermined distance after power is removed from the drive motor 42. Alternatively, a brake may be used to more rapidly decelerate the part carrier 20. For example, the brake may be held in an open/disengaged state while powered, and may be biased to contact the track 14b or friction wheel 44 when electrical power is removed.

Preferably, the flag 50 is selected to have a physical length such that the part carrier 20 will come to a complete stop within the length of the flag 50. When the clear sensor 52 on track 14b is tripped by the flag 50, the controller 18b on track 14b will send a signal to the logic controller 70 on the control buss 72. This signal indicates to the logic controller 70 that the part carrier 20 is presently located on its track 14b and that track 14a is clear to accept a part carrier 20. The above sequence of operation then will be repeated but for rail assemblies 11c and 11b. Thus, the logic controller 70 will send a signal to the controller 18c of rail assembly 11c and to the controller 18b of rail assembly 11b that the part carrier 20 may be moved onto rail assembly 11c. The controller 18b will then apply power to its high power buss bars 46 on track 14b while controller 18c applies power to its high power buss bars 46 on track 14c. The drive motor 42 will then propel the part carrier 20 from track 14b to track 14c.

From the foregoing it will be appreciated that the system 10 provides a highly cost efficient alternative to traditional electrified monorail assemblies that require the use of a dedicated controller on each carrier assembly. The present system 10 and method, because of its significantly lower cost and ease of installation, is expected to find utility in many applications where a traditional electrified monorail assembly would have been too costly to implement. Furthermore, since the system 10 is modular in its construction, the rail assemblies can easily be made to specific lengths to suit the particular needs of each application.

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. An electrified monorail assembly comprising:
   a track having a length;
   a plurality of electrically conductive buss bars disposed along the length of the track;
   a controller operatively connected with the track and in electrical communication with the plurality of electrically conductive buss bars, the controller configured to selectively energize the plurality of electrically conductive buss bars; and
   a trolley assembly configured to ride along the length of the track, the trolley assembly including:
      a brush plate configured to be placed in electrical communication with the plurality of buss bars;
      a drive motor in communication with the brush plate;
      wherein the drive motor is configured to propel the trolley assembly along the track when the buss bars are energized; and
   a first proximity sensor operatively connected with the track and in communication with the controller, the first proximity sensor configured to detect the presence of the trolley assembly on the track.

2. The assembly of claim 1, wherein the drive motor includes a friction wheel configured to contact a surface of the track.

3. The assembly of claim 1, further comprising a load bar coupled with the trolley assembly, and a carrier fixture coupled with the load bar; and wherein the carrier fixture is configured to support a component part.

4. The assembly of claim 1, wherein the controller is configured to provide a control signal to an adjacent monorail assembly if the presence of a trolley is detected by the first proximity sensor; and
wherein the control signal includes an indication to de-energize.

5. The assembly of claim 1, further comprising a second proximity sensor disposed on the track and in communication with the controller, the second proximity sensor configured to detect the presence of a trolley assembly on the track; and
wherein the controller is configured to de-energize the plurality of buss bars if the presence of a trolley is detected by the second proximity sensor.

6. The assembly of claim 1, wherein the controller is configured to electrically couple with a control signal buss and with a power buss;
wherein the control signal buss includes a supervisory controller; and
wherein the power buss is a three-phase AC power buss.

7. An electrified monorail system comprising:
a first electrified monorail assembly;
a second electrified monorail assembly;
wherein each of the first and second electrified monorail assemblies respectively includes:
a track having a length;
a plurality of electrically conductive buss bars disposed along the length of the track;
a controller operatively connected with the track and in electrical communication with the plurality of buss bars, the controller configured to selectively energize the plurality of electrically conductive buss bars; and
a proximity sensor operatively connected with the track and in communication with the controller, the proximity sensor configured to detect the presence of a trolley assembly on the track; and
wherein the track of the second electrified monorail assembly is disposed adjacent to and downstream of the track of the first electrified monorail assembly.

8. The system of claim 7, further comprising a trolley assembly configured to ride along the tracks of the respective first and second electrified monorail assemblies, the trolley assembly including:
a brush plate configured to be placed in electrical communication with the plurality of buss bars of the first and second electrified monorail assemblies; and
a drive motor in communication with the brush plate; and
wherein the drive motor is configured to propel the trolley assembly along the track when the buss bars in communication with the brush plate are energized.

9. The system of claim 8, wherein the drive motor includes a friction wheel configured to contact a surface of the track.

10. The system of claim 9, further comprising a load bar coupled with the trolley assembly, and a carrier fixture coupled with the load bar; and
wherein the carrier fixture is configured to support an component part.

11. The system of claim 7, wherein the controller of the second electrified monorail assembly is configured to send a control signal to the controller of the first electrified monorail assembly when the proximity sensor of the second electrified monorail assembly detects the presence of a trolley assembly.

12. The system of claim 11, wherein the controller of the first electrified monorail assembly is configured to de-energize the plurality of buss bars of the first electrified monorail assembly in response to the control signal.

13. The system of claim 7, wherein the controller of the first electrified monorail assembly is configured to de-energize the plurality of buss bars of the first electrified monorail assembly if the presence of a first trolley assembly is detected by the proximity sensor of the first electrified monorail assembly and the track of the second electrified monorail assembly is occupied by a second trolley assembly.

14. The system of claim 13, wherein the control signal buss includes a supervisory controller; and
wherein the power buss is a three-phase AC power buss.

15. The system of claim 14, wherein the controller of first electrified monorail assembly and the controller of the second electrified monorail assembly are each configured to pass AC power from the AC power buss onto the respective plurality of buss bars in response to a control signal.

16. The system of claim 7, wherein the controller of first electrified monorail assembly and the controller of the second electrified monorail assembly are each configured to electrically couple with a control signal buss and with a power buss.

17. The system of claim 7, further comprising a plurality of hangers configured to suspend the track of the first and second electrified monorail assemblies from a support beam.

\* \* \* \* \*